(12) United States Patent
Qiu et al.

(10) Patent No.: US 12,487,168 B2
(45) Date of Patent: Dec. 2, 2025

(54) SYSTEMS AND METHODS FOR CELL COUNT MEASUREMENTS

(71) Applicant: Nexcelom Bioscience LLC, Lawrence, MA (US)

(72) Inventors: Jean Qiu, Andover, MA (US); Peter Y. Li, Andover, MA (US); Leo L. Chan, Lawrence, MA (US); Jordan Bell, Lawrence, MA (US)

(73) Assignee: Revvity Health Sciences, Inc., Waltam, MA (US)

( * ) Notice: Subject to any disclaimer, the term of this patent is extended or adjusted under 35 U.S.C. 154(b) by 994 days.

(21) Appl. No.: 17/627,630

(22) PCT Filed: Sep. 2, 2020

(86) PCT No.: PCT/US2020/049047
§ 371 (c)(1),
(2) Date: Jan. 14, 2022

(87) PCT Pub. No.: WO2021/046116
PCT Pub. Date: Mar. 11, 2021

(65) Prior Publication Data
US 2022/0307966 A1    Sep. 29, 2022

Related U.S. Application Data

(60) Provisional application No. 62/895,704, filed on Sep. 4, 2019.

(51) Int. Cl.
*G01N 15/1434* (2024.01)
*B01L 3/00* (2006.01)
(Continued)

(52) U.S. Cl.
CPC .... *G01N 15/1434* (2013.01); *B01L 3/502761* (2013.01); *B01L 2200/0684* (2013.01); *B01L 2300/0819* (2013.01); *B01L 2300/168* (2013.01); *G01N 15/01* (2024.01); *G01N 2015/1486* (2013.01)

(58) Field of Classification Search
None
See application file for complete search history.

(56) References Cited

U.S. PATENT DOCUMENTS

2006/0068412 A1 * 3/2006 Tang ............... B82Y 30/00
435/287.2
2009/0258372 A1 * 10/2009 Lopez ............. G01N 33/5432
435/7.1
(Continued)

FOREIGN PATENT DOCUMENTS

WO   WO-2017216310 A1 * 12/2017 ........... G02B 21/241
WO   WO-2019165119 A1 *  8/2019 ............ B01L 3/5085

*Primary Examiner* — Elizabeth A Robinson
*Assistant Examiner* — Brittany I Fisher
(74) *Attorney, Agent, or Firm* — Milstein Zhang & Wu LLC

(57) ABSTRACT

The invention provides novel sample chambers, units and multi-well plates, and systems and methods thereof, for built-in measurement assurance of cell counting methods and calibrated and/or quality-assured measurement and analysis of diverse types of biological cells, e.g., cell count, cell size, cell concentration, cell sub-population, cell morphology, cell viability, etc.

14 Claims, 14 Drawing Sheets

(51) Int. Cl.
*G01N 15/14* (2024.01)
*G01B 9/04* (2006.01)
*G01N 15/01* (2024.01)
*G01N 15/10* (2024.01)

(56) References Cited

U.S. PATENT DOCUMENTS

2012/0269683 A1* 10/2012 Packirisamy ........ G02B 6/1225
                                                        422/82.11
2018/0126381 A1* 5/2018 Huff ................. G01N 27/44721
2021/0224978 A1* 7/2021 Jarvius ................... G02B 21/34

* cited by examiner

A

B

A-B

C

D

A

B

C

A

B

C

SYSTEMS AND METHODS FOR CELL COUNT MEASUREMENTS

PRIORITY CLAIMS AND RELATED PATENT APPLICATIONS

This application is the U.S. national phase of and claims priority to PCT/US20/49047, filed Sep. 2, 2020, which claims the benefit of priority to U.S. Provisional Application Ser. No. 62/895,704, filed on Sep. 4, 2019, the entire content of each of which is incorporated herein by reference for all purposes.

TECHNICAL FIELDS OF THE INVENTION

The invention generally relates to measurement and analysis of biological samples. More particularly, the invention relates to novel cell-counting chambers, units and multi-well plates, and systems and methods thereof, for calibrated and/or quality-assured measurement and analysis of diverse types of biological cells, including cell count, cell size, cell concentration, cell sub-population, cell morphology and cell viability measurements.

BACKGROUND OF THE INVENTION

An important aspect in medical diagnosis and biomedical research involves detection, identification, quantification, and characterization of various cells and biomolecules of interest through testing of biological samples such as blood, spinal fluid, cell culture and urine. Healthcare providers and biomedical researchers routinely analyze biological samples for the microscopic presence, cell counts and concentrations of cells and biomolecules.

In clinical practice, for example, the concentration of various blood cells, such as red blood cells and white blood cells, can provide vital information regarding the health situation of a patient. Cell counting is an important parameter in a cell-based assay. It is used to determine proper seeding density for cell culture, normalization for protein-based assays, or determine number of cells required for downstream assays such as flow cytometry.

Traditionally, cell counting is manually performed with a hemocytometer under a light microscope. In the recent decade, automated cell counters have become available and gained popularity in biology laboratories. These cell counters are mainly for single sample detection and require the operator to place disposable slides into the instrument for each cell count. Although existing technologies is significantly improved over manual counting with reduced operation time and operator-dependent variations, they continue to require a great amount of time when a large number of samples need to be analyzed.

Calibration and quality assurance methodologies remain inadequate and underdeveloped. In cell therapy, cell count is used to control the dose of cells administered to a patient. Cell viability measurements, i.e., measuring and calculating the fraction of dead and live cells, are important in both molecular biology research and in clinical diagnosis and treatment. Biological samples vary widely in concentration and composition. Without accurate calibration and proper measurement assurance, it can be difficult to know whether a particular sample is amenable to automated image-based cell counting and what level of confidence can be placed in the obtained data.

It is valuable to have counting instruments and methods that not only provide efficient cell count measurements, but also include built-in calibration and measurement assurance functions, ensuring that the sample and the method are both suitable to provide accurate counting measurements.

Thus, there is an ongoing need for novel and improved devices and methods that allow rapid calibration and measurement assurance of automated cell counting measurements suitable for application to biological samples of diverse cell types and conditions and provide confidence in the quality of cell counting data.

SUMMARY OF THE INVENTION

The invention provides novel sample chambers, analysis units, multi-well plates and cell counting systems with built-in capabilities for high-throughput automated calibration and assurance of cell measurement and analysis, for example, of cell counts, concentrations, sub-populations, morphology, size, viability, cell cycle, surface marker, etc.

Sample chambers, analysis units and multi-well plates are provided with well-defined microscale markings, objects or features (sometimes collectively referred to as "features" or "microscale features") in the imaging path that simplify calibration of measurement and quality assurance of the results, which are critical to biomedical applications.

In one aspect, the invention generally relates to a sample chamber suitable for holding a liquid sample for optical imaging. The sample chamber comprises: (a) an inlet for introducing the liquid sample into the sample chamber for observation or analysis; (b) an imaging chamber for holding the liquid sample, wherein the imaging chamber is in fluid communication with the inlet and comprises one or more optically transparent windows suitable for observation or analysis of the liquid sample inside the imaging chamber; and (c) an outlet in fluid communication with the imaging chamber for air escape or outflow of the liquid sample. The imaging chamber is characterized by one or more of: a varying chamber height, either continuous or step-wise, traversing at least a portion of the one or more optically transparent windows, defined features having one or more known offsets from a focal plane of the imaging chamber, wherein the features are optically accessible via the one or more optically transparent windows, defined features having one or more known dimensions, areas or volumes, wherein the features are optically accessible via the one or more optically transparent windows, and the defined features exhibit one or more fluorescent colors in one or more intensities.

In another aspect, the invention generally relates to a sample analysis unit. The sample analysis unit comprises: (i) a mixing well for preparation of a liquid sample for analysis; and (ii) a sample chamber disclosed here that is deposed in spatial proximity to the mixing well.

In yet another aspect, the invention generally relates to a sample analysis unit. The sample analysis unit comprises: (i) a mixing well for preparation of a liquid sample for analysis; and (ii) a first sample chamber suitable for holding a liquid sample for optical imaging. The first sample chamber comprises: (a) a first inlet for introducing the liquid sample into the first sample chamber for observation or analysis; (b) a first imaging chamber for holding the liquid sample, wherein the first imaging chamber is in fluid communication with the first inlet and comprises a first or first set of optically transparent window(s) suitable for observation or analysis of the liquid sample inside the first imaging chamber; and (c) a first outlet in fluid communication with the first imaging chamber for air escape or outflow of the liquid sample. The first imaging chamber is characterized by one or more of: (i)

a varying first chamber height, either continuous or stepwise, traversing at least a portion of the first or first set of optically transparent window(s), (ii) first defined features having one or more known offsets from a focal plane of the first imaging chamber, wherein the features are optically accessible via the first or first set of optically transparent window(s), (iii) first defined features having one or more known dimensions, areas or volumes, wherein the first features are optically accessible via the first or first set of optically transparent window(s), and (iv) the first defined features exhibit one or more fluorescent colors in one or more intensities.

In yet another aspect, the invention generally relates to a multi-well plate or device comprising a sample analysis unit disclosed herein.

In yet another aspect, the invention generally relates to a multi-well plate comprising a plurality of sample analysis units, wherein each sample analysis unit comprises: (i) a mixing well for preparation of a liquid sample for analysis; and (ii) one or more sample chambers suitable for holding a liquid sample for optical imaging. Each sample chamber comprises: (a) an inlet for introducing the liquid sample into the sample chamber for observation or analysis; (b) an imaging chamber for holding the liquid sample, wherein the imaging chamber is in fluid communication with the inlet and comprises one or more optically transparent windows suitable for observation or analysis of the liquid sample inside the imaging chamber; and (c) an outlet in fluid communication with the imaging chamber for air escape or outflow of the liquid sample. The imaging chamber is characterized by: defined features having one or more known offsets from a focal plane of the imaging chamber, wherein the features are optically accessible via the one or more optically transparent windows, and/or defined features having one or more known dimensions, areas or volumes, wherein the features are optically accessible via the one or more optically transparent windows. The defined features exhibit one or more fluorescent colors in one or more intensities.

In yet another aspect, the invention generally relates to a system for analyzing biological samples, comprising a sample analysis unit or a multi-well plate disclosed herein.

In yet another aspect, the invention generally relates to a method for assessing a focus setting of an imaging system for cell-counting analysis. The method comprises: adjusting manually or automatically the focus position until one or more defined features of the imaging chamber appear in the best focus; recording the best focus position according to the defined features; adjusting manually or automatically the focus to an attempted cell focus position for a sample at which the cells are presumed to be in best focus for cell counting; recording the attempted cell focus position according to the sample; performing image acquisition for cell counting measurement; comparing the recorded focus positions according to the defined features and according to the sample; and determining if the difference between the two recorded focus positions is acceptable to confirm or reject the cell counting measurement.

In yet another aspect, the invention generally relates to a method for obtaining a focus setting of an imaging system for cell-counting analysis. The method comprises: adjusting manually or automatically the focus position until one or more defined features of the imaging chamber appear in best focus; adjusting the focus position manually or automatically by a predefined offset from the focus position of the one or more defined features; and performing image acquisition for the cell counting measurement.

In certain embodiments, the focus position is in each instance adjusted manually.

In certain embodiments, the focus position is in each instance adjusted automatically.

In yet another aspect, the invention generally relates to a method for calibrating cell size measurement of an imaging system for cell-counting analysis. The method comprises: measuring sizes of cells in a sample; measuring sizes of one or more defined features of the imaging chamber having known sizes; comparing the measured sizes of the defined features to their known sizes; determining a calibration factor based on the comparison of the known sizes and measured sizes of the features; applying the calibration factor in cell size measurement; and reporting the adjusted values of cell size measurement.

In yet another aspect, the invention generally relates to a method for assessing a cell size measurement of an imaging system for cell-counting analysis. The method comprises: measuring sizes of cells in a sample; measuring sizes of one or more defined features of the imaging chamber having known sizes; comparing the measured sizes and the known sizes of the defined features; and determining if the difference between the measured sizes and known sizes of the features is acceptable to confirm or reject the cell size measurement.

In yet another aspect, the invention generally relates to a method for simultaneously assessing focus and cell size measurement of an imaging system for cell-counting analysis. The method comprises: adjusting manually or automatically the focus position until one or more defined features of the imaging chamber appear in the best focus; measuring sizes of cells in a sample; measuring sizes of one or more defined features of the imaging chamber having known sizes; comparing the measured sizes of the defined features to their known sizes; determining if the difference between the two measurements is acceptable to confirm or reject the setting for focus and cell size measurement; and repeating these steps until an acceptable size measurement is obtained.

In yet another aspect, the invention generally relates to a method for assessing a sample for suitability for cell-counting analysis without diluting or concentrating the sample of the sample. The method comprises: providing a sample in one or more sample chambers having a plurality of chamber heights; recording cell counts of the sample at a plurality of chamber heights, and comparing the recorded cell counts to determine if they are proportional to the chamber heights to confirm or reject the cell count measurement.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights, and analyzing the recorded cell count measurements to determine chamber heights at which cell count measurements are proportional to the chamber heights to confirm the corresponding cell count measurements.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights, and analyzing the recorded cell count measurements to determine the range of cell counts at which cell count measurements are proportional to the chamber heights to confirm the corresponding cell count measurements.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights; analyzing the recorded cell count measurements to determine which of the measurements are proportional to the known chamber heights; and confirming the cell count measurements that are sufficiently proportional to chamber height and rejecting those that are not.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights, and scoring the obtained cell count measurements based on how well the counts match expected values for the known chamber height; and confirming those measurements that meet pre-determined specifications and rejecting those that do not.

In yet another aspect, the invention generally relates to a method for calibrating a fluorescence measurement of an imaging system for cell-counting analysis. The method comprises: measuring fluorescence of cells in a sample; measuring fluorescence of one or more defined features of the imaging chamber having known fluorescence; comparing the measured fluorescence of the defined features to their known fluorescence; determining a calibration factor based on the comparison of measured fluorescence and known fluorescence of the defined features; applying the calibration factor in fluorescence measurement of the cells; and reporting the adjusted values of fluorescence measurement.

In yet another aspect, the invention generally relates to a method for assessing a fluorescence measurement of an imaging system for cell-counting analysis. The method comprises: measuring fluorescence of cells in a sample; measuring fluorescence of one or more defined features of the imaging chamber having known fluorescence; and comparing the measured fluorescence of the defined features and their known fluorescence to confirm or reject the fluorescence measurement.

In yet another aspect, the invention generally relates to a method for calibrating and/or assessing a cell-counting analysis, comprising performing calibration or assessment according to one or more of methods disclosed herein.

In yet another aspect, the invention generally relates to a method for cell count measurement using a sample chamber disclosed herein, a sample analysis unit disclosed herein, a multi-well plate disclosed herein, or a system for analyzing biological samples disclosed herein.

DETAILED DESCRIPTION OF THE INVENTION

The invention is based in part on the novel sample chambers, units and multi-well plates, and systems and methods thereof, that have built in features allowing assessment of counting methods and calibrated and/or quality-assured measurement and analysis of diverse types of biological cells, e.g., cell count, cell size, cell concentration, cell sub-population, cell morphology and cell viability measurements.

Calibration and Assessment of Cell-Count Proportionality

A feature of the present invention is that verification of cell count proportionality is achieved without the need for dilution of the sample and repetitive measurement of the samples of different concentrations. Traditionally, proper proportionality is verified with dilution of the sample to provide confidence in a counting method and protocol. Instead of creating a series of concentrations to verify proportionality, the disclosed approach evaluates cell count proportionality through measurement of diverse areas of the imaging chamber having varied but defined chamber thicknesses. In particular, the number of particles in the field of view is modulated by a change in the chamber thickness, which is proportional to the volume.

Figure 1:
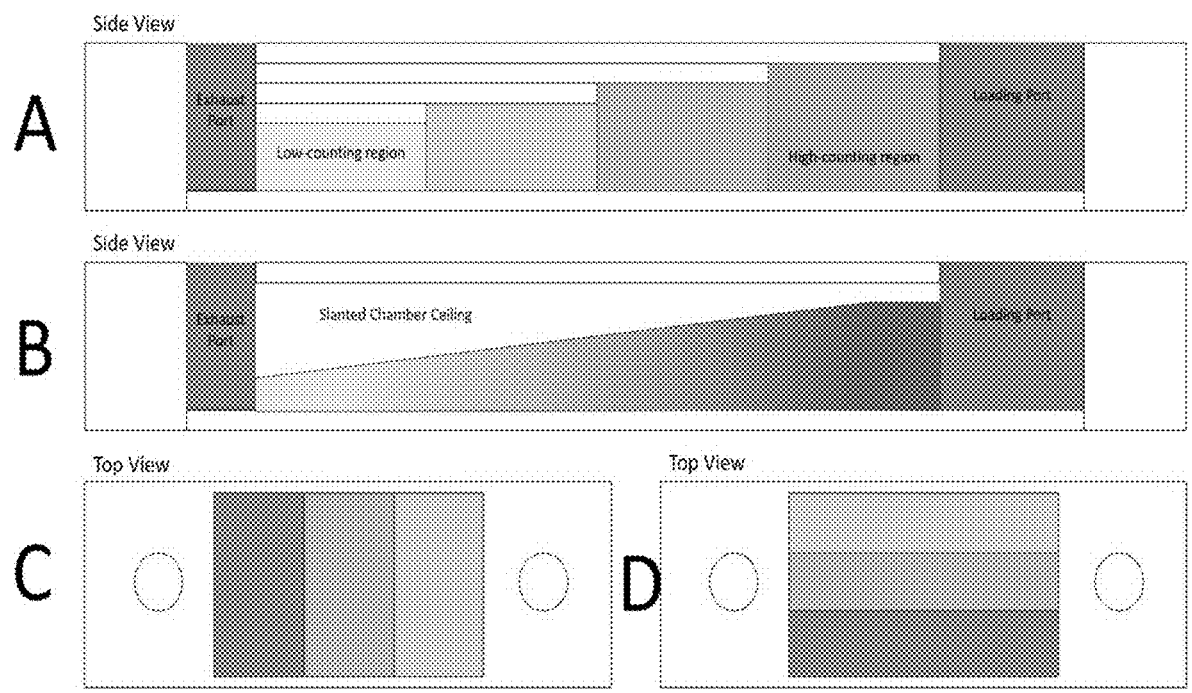
FIG. 1. Schematic illustration of exemplary multiple chamber thicknesses.

As schematically illustrated in FIG. 1, multiple thicknesses can be produced within a single counting chamber. The change in chamber thickness can be made in discrete steps (FIG. 1A) or continuously (FIG. 1B). The change in chamber thickness can be made along any axis of the chamber, as illustrated in FIG. 1C (longitudinally from an inlet to an outlet) and FIG. 1D (transversally from one edge of chamber to another edge of chamber).

Figure 2:
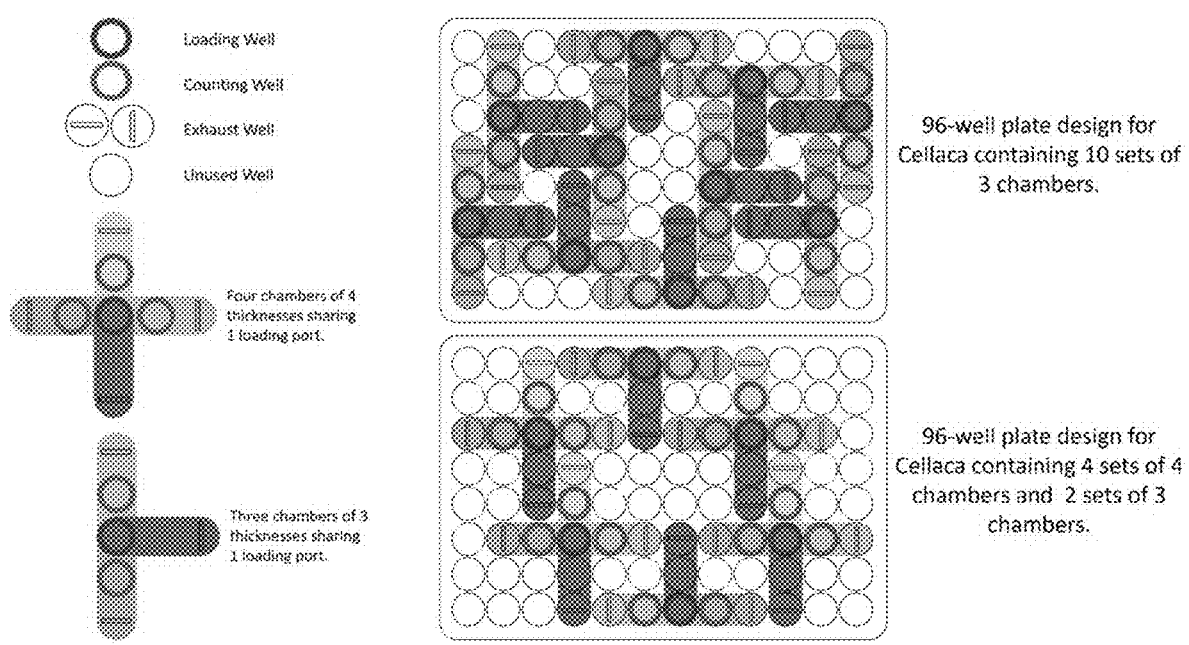
FIG. 2. Schematic illustration of exemplary counting units and assemblies of counting chambers of different thicknesses being used together.

As schematically illustrated in FIG. 2, multiple counting chambers of different thicknesses can be used together. Multiple chambers can be produced as single units to be used as a set. In FIG. 2A, four chambers of four thicknesses and a single inlet port are grouped together into a set. In FIG. 2B, three chambers of three thicknesses and a single inlet port are grouped together into a set. Multiple chambers can also be joined into a multi-chambered device (e.g., a 96-well plate).

Figure 6:
FIG. 6. Exemplary demonstration of cell counting proportionality to chamber thickness (step-wise variation). (A) Exemplary counting chambers of various thicknesses. (B) Proportionality demonstration.
Figure 6:
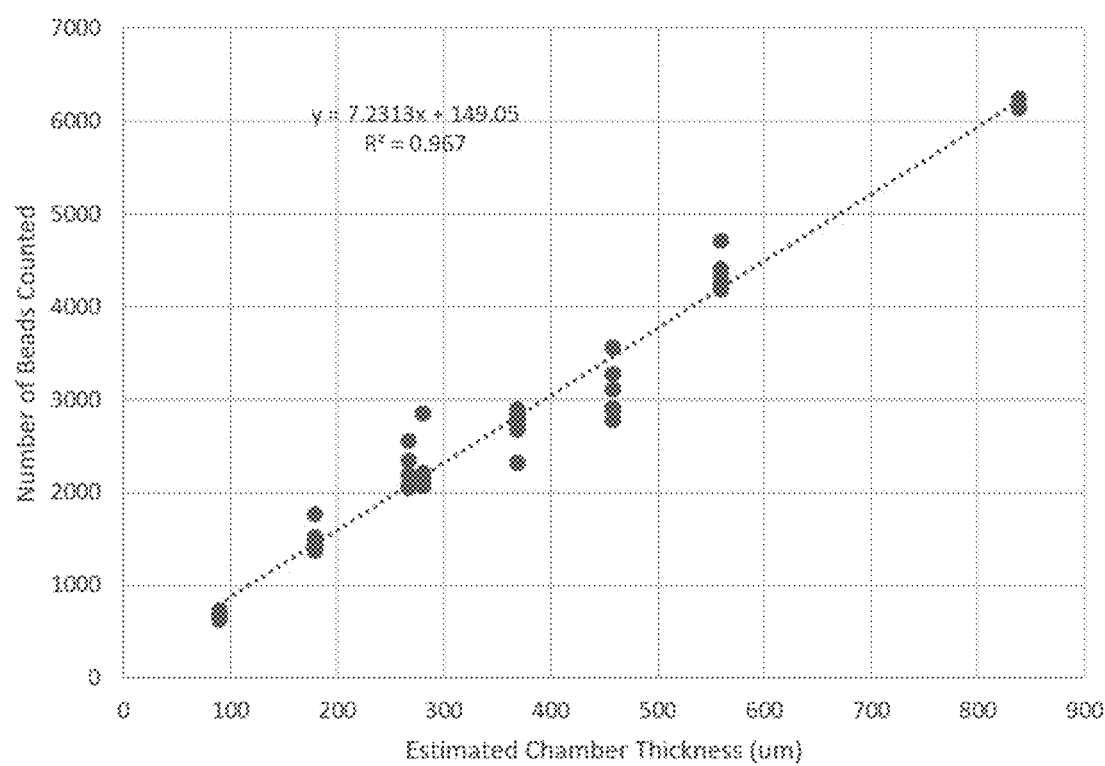

FIG. 6 shows an exemplary demonstration of cell counting proportionality to chamber thickness where the thickness changes in a step-wise fashion. Set of counting chambers of various thicknesses (FIG. 6A) are used where different combinations of adhesive spacer layers have been incorporated into each slide. When filled with samples of the same bead/cell suspension, the number of objects counted is proportional to the chamber thickness (FIG. 6B).

Chambers with varied thicknesses may be produced using multiple thicknesses of adhesive, multiple layers of adhesive, and/or structures formed using imprint lithography from UV-curing polymers.

Figure 7:
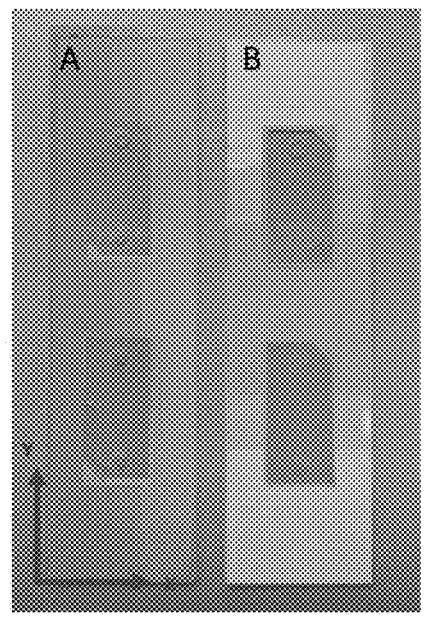
FIG. 7. Exemplary demonstration of cell counting proportionality to chamber thickness (continuous variation). (A) Exemplary counting chambers of various thicknesses. (C) & (D) Proportionality demonstration.
Figure 7:
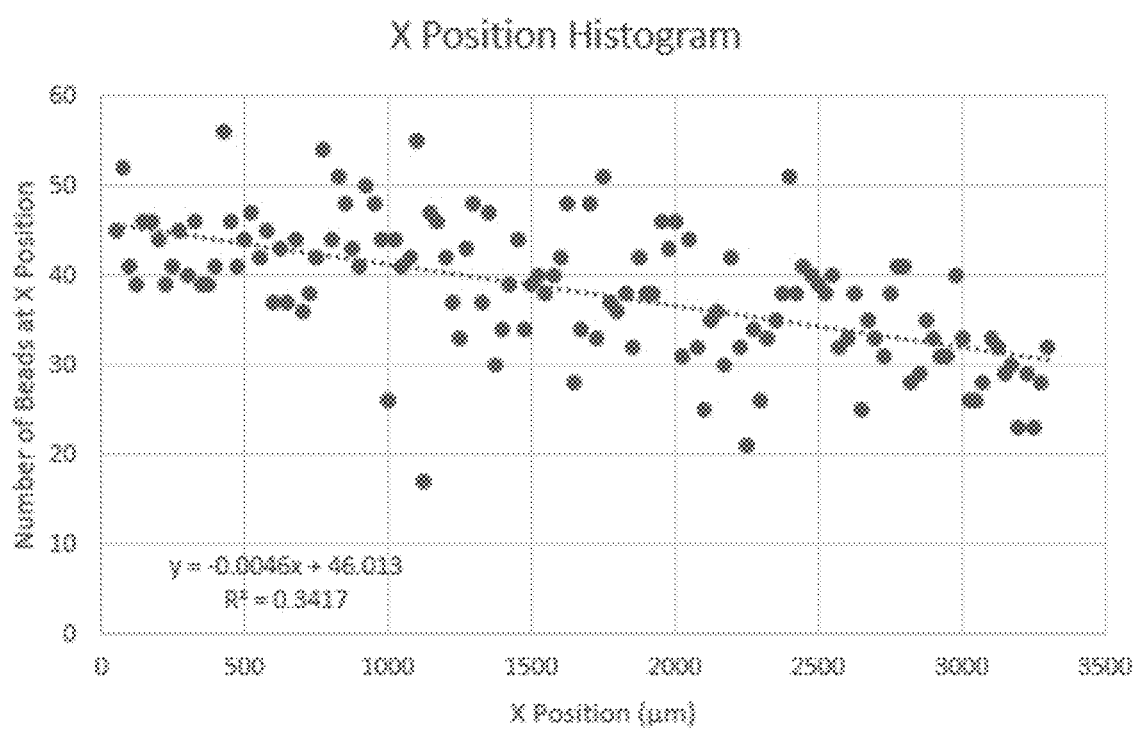
Figure 7:
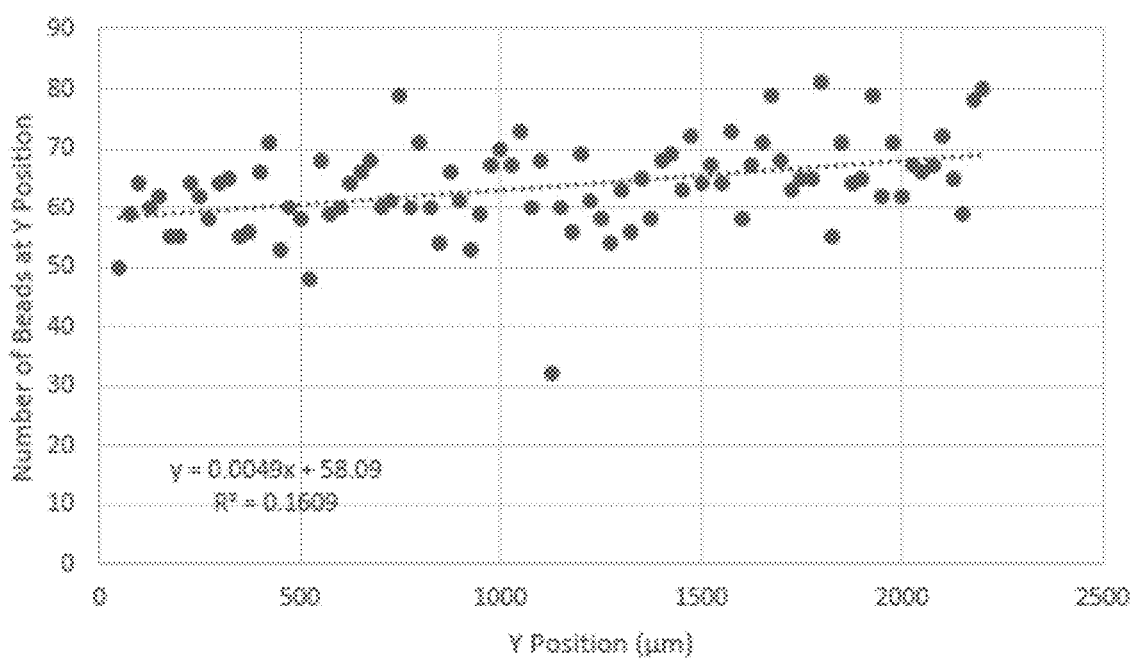

FIG. 7 shows an exemplary demonstration of cell counting proportionality to chamber thickness where the thickness changes continuously. FIG. 7A shows two counting chambers with continuously varying chamber heights (left: transversal variation; right: longitudinal variation), which were made using multiple layers of adhesive spacer. Areas of adhesives have been highlighted in blue, with darker blue indicating thicker adhesive. The adhesive layers surrounding the counting chambers formed steps, but the ceiling of the chamber transitioned smoothly from the thick side of the chamber to the thin side, leading to a continuously tapered chamber thickness. Two configurations were made, with the change in chamber thickness occurring both transversal (X direction) and longitudinal (Y direction) the counting chamber.

In one experiment, a 5 μm bead solution was loaded into the chamber (2e6 beads/mL), and a histogram of the bead positions was obtained. The slope and R2 value obtained from a linear fit of the histogram provide metrics of proportionality. The X-position histogram shown in FIG. 7B was obtained from one of the counting chambers of the slide A, and the Y position histogram in FIG. 7C was obtained from one of the chambers in slide B.

Cell counting chambers can be configured to sharing common inlet (loading) ports. A multi-chambered device may contain independent chambers or chambers joined at one or more common sample loading ports. In FIG. 2C, the multi-well plate features 10 sets of three chamber units. In FIG. 2D, the multi-well plate features 4 sets of 4 chamber units and 2 sets of three chamber units.

Figure 8:
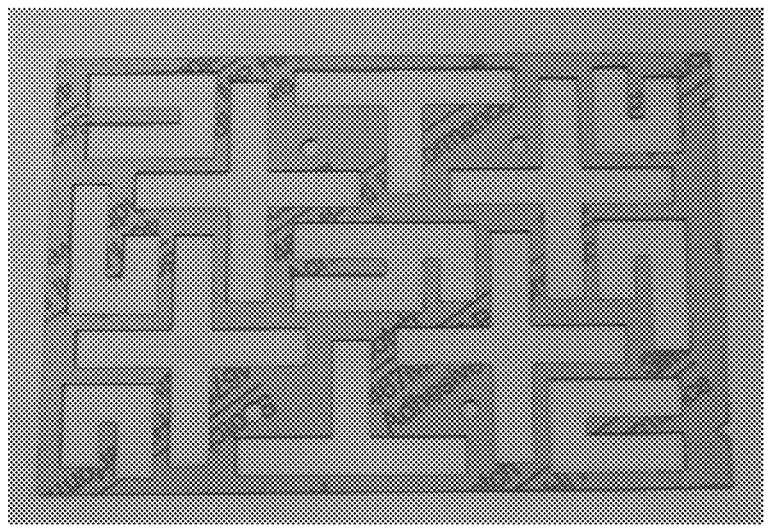
FIG. 8. Exemplary cell counting chambers sharing common loading ports.
Figure 8:
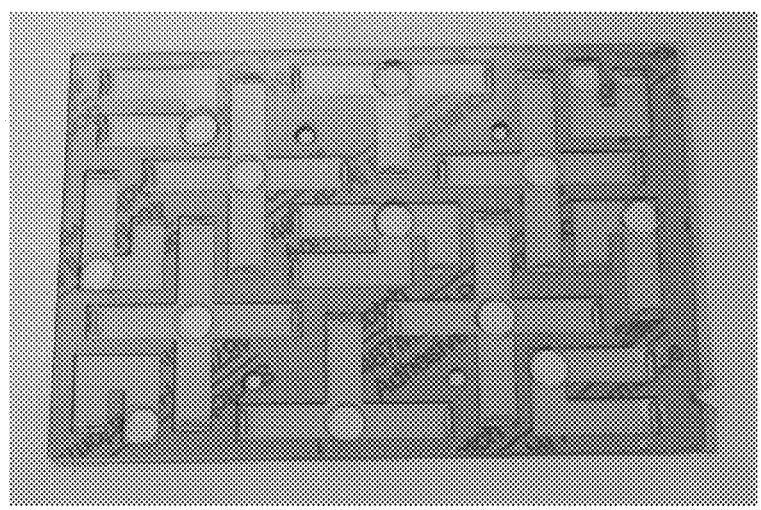
Figure 8:
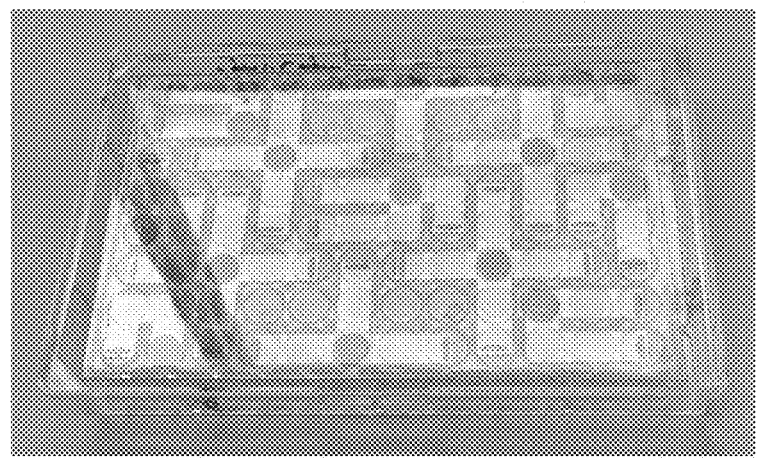

FIG. 8 shows a multi-well plate exemplifying this multi-chamber approach. Testing showed that cell suspension consistently flew into multiple counting chambers at once. FIG. 8A shows the cut-out adhesive layer (backing paper not removed) that defines the cell counting chambers. FIG. 8B displays the adhesive layer with an overlaid top sheet (protective green film not removed) showing alignment of loading and exhaust ports. FIG. 8C shows the underside of the completed cell counting chambers adhered to the bottom of a 96-well plate. Multiple plates were tested for proper fluid flow and cell counting consistency. No significant differences in concentration measurement were observed for the counting chambers in different configurations when a bead solution was added to multiple loading ports.

Figure 9:
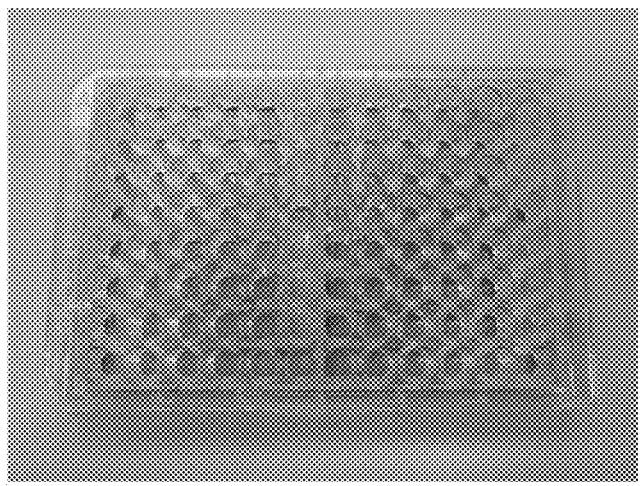
FIG. 9. Exemplary cell counting chambers of different thicknesses sharing common loading ports.
Figure 9:
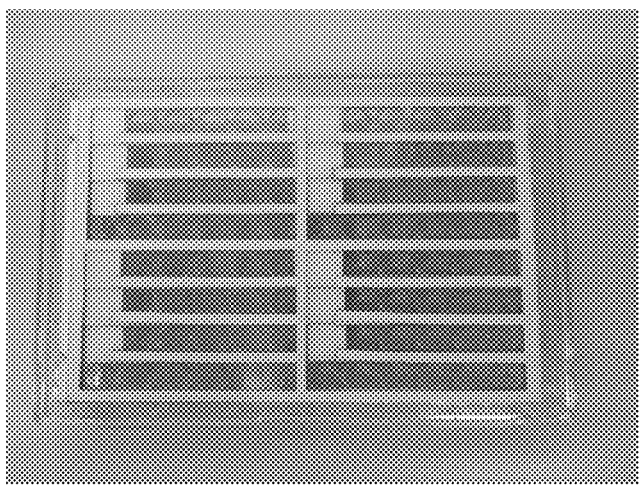
Figure 9:
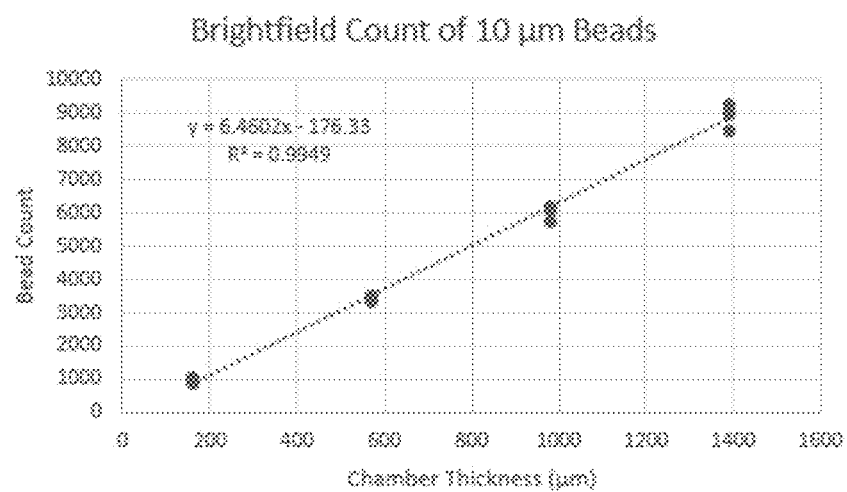

In FIG. 9, a multi-well plate contains 4 sample loading ports, each being connected to 4 counting chambers of different thicknesses. FIG. 9A depicts the top view while FIG. 9B depicts the bottom view of the plate. Each chamber extends across 4 sample viewing windows. The plate can accommodate 4 samples, producing a 4-replicate linearity curve at 4 points of effective dilution for each sample, as shown in FIG. 9C.

The imaging system can quickly count cells loaded into chambers that are manufactured into the bottom of a standard 96-well plate. Custom software features may be incorporated to analyze the measured proportionality of the cell count and return judgement on the suitability of the sample for automated counting by the instrument. The software may also automatically analyze counts for the various chamber heights and indicate to the user whether the cell suspension are to be further diluted or concentrated for more successful counting. Automatic exclusion of portions of the chamber with too many or too few objects can also be achieved.

Calibration and Assessment of System Focus

Another feature of the present invention is the built-in microscale markings or features, such as 2-dimensional or 3-dimensional markings on chamber surfaces, with known offsets ensure consistent focus for cell counting and viability determination. This feature of the invention allows proper and consistent focus that is critical to image-based cell counting. Consistent focus avoids alteration of cell appearance under brightfield and fluorescent illumination which can degrade the accuracy of cell-counting algorithms.

Figure 3:
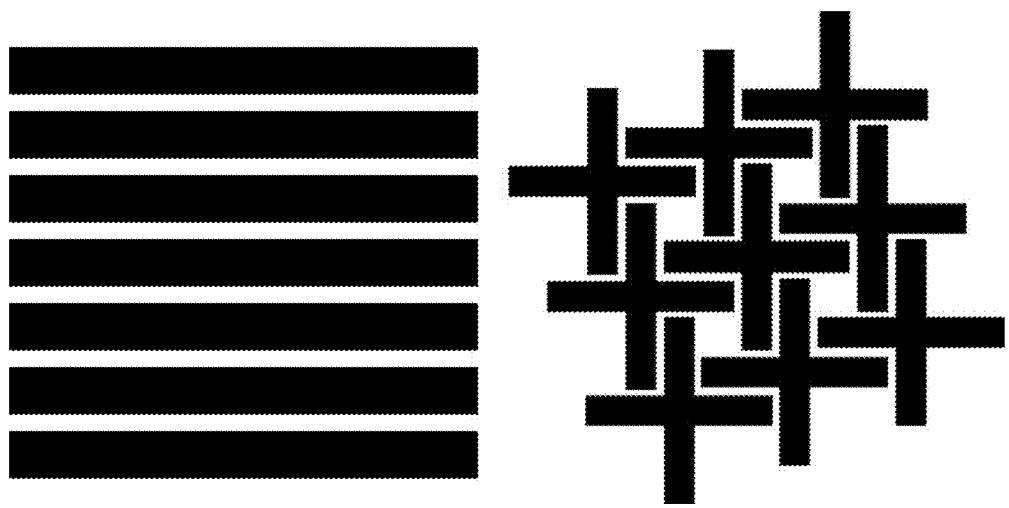
FIG. 3. Schematic illustration of exemplary markings or features for system focus calibration or assessment.

Markings or features at known locations relative to the floor of the image chamber are built in to assist with system focus and ensure focus consistency. For example, features spaced across the field of view allow for evaluation of whether the chamber is level. Features featuring high intensity contrast at the resolution level of the system can provide precise determination of focus position. For example, as schematically illustrated in FIG. 3, features (both coarse and fine detail) that contain areas that come into high contrast when in ideal focus position can provide a more sensitive method of determining relative focus. Furthermore, 3-dimensional focus objects can use a variety of length and height scales that allow an algorithm to determine changes in contrast over a wider range of distances.

An automated focusing method can be implemented to determine the focus position for which the features are at best focus position. This can be accomplished by an optimization algorithm in combination with a focus score. Careful calibration based on how the image of the feature changes with focus position can lead to fast calibration of the system focus. Well-fabricated microscale features allow for such calibration to yield nearly instantaneous registration of focus position.

Once the system instrument has a registered focus position, an offset can be set to record the ideal focus position for a particular type of cell. This can be done manually by the user based on visual inspection, automatically based on a focus score, or by using a built-in offset for a particular assay. Once the cells' ideal focal position and the plane of the reference markings are established, the instrument can quickly move to the ideal focus for acquisition of subsequent images.

Calibration and Assessment of Cell Size Measurement

Another feature of the present invention is the use of markings or features having well-defined sizes, which allow the system to calibrate and assess cell size measurements. Cell-counting instruments report the size of the objects they detect. The size reported by a segmentation algorithm varies with the focal position and the image brightness. An out-of-focus cell can appear larger, and may be reported as such, but may also display less contrast, leading to a smaller size reported by a texture algorithm. For fluorescent images, brighter illumination tends to give larger cell measurements. Poorly measured cell size can also affect concentration measurements.

Size calibration involves obtaining an accurate pixel to micron conversion as well as evaluating accuracy of segmented blob sizes. The appearance of markings of different sizes may be affected differently by optical diffraction.

Features with known spacing over larger distances will provide more accurate estimates of pixel to micron conversion factors. For pixel to micron conversion, it is advantageous to utilize markings or features that are as far apart as the image allows without distortion and oriented in 2D. For the segmented blob size accuracy, it is best to include features of size and optical behavior comparable to the cells to be counted.

Figure 4:
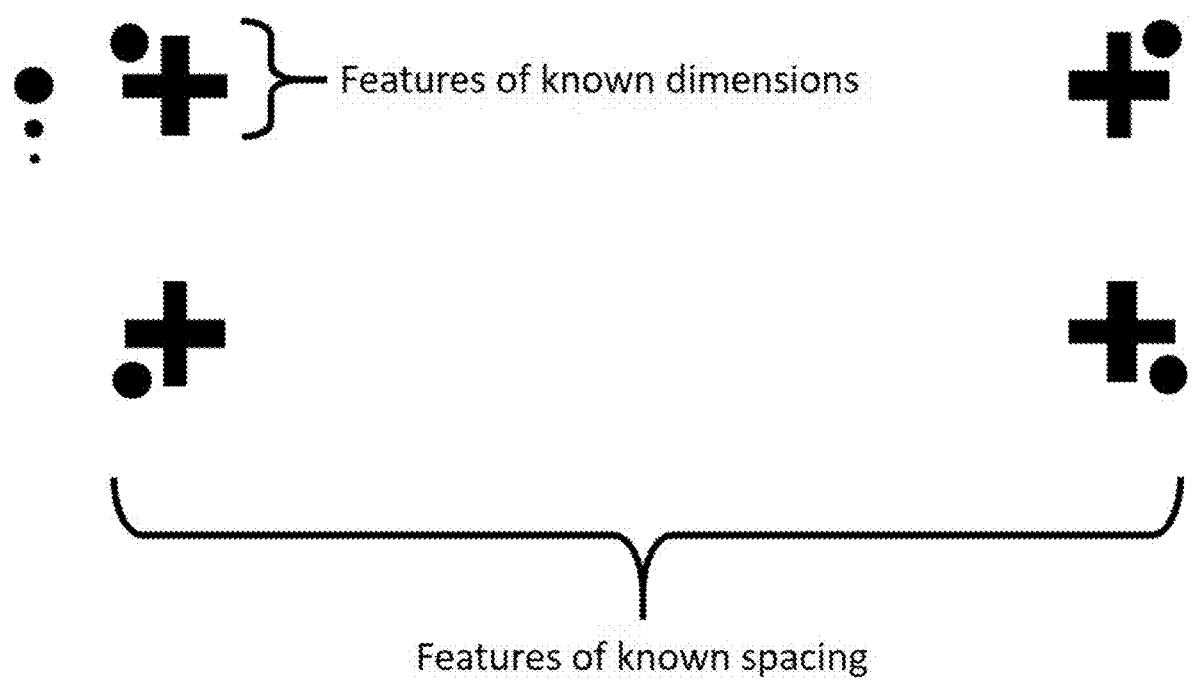
FIG. 4. Schematic illustration of exemplary markings or features for cell size calibration or assessment.

FIG. 4 is schematically illustration of microscale features of known dimensions allow for calibration of segmentation algorithms. For camera calibration a checkerboard pattern may be utilized. Algorithms have been devised which are well-suited to finding the lines of the checkerboard with subpixel accuracy. Another example is a cluster of dots with well-defined distances between them. For instance, features such as 5 µm dots in a defined pattern can be used both to establish a calibrated coordinate system for the measurement of cell location and to assess the accuracy of segmented size.

Calibration and Assessment of Cell Fluorescence Measurement

Another feature of the present invention is the use of objects or features having well-defined fluorescence, which allow the system to calibrate proper fluorescent illumination and assess fluorescence measurements. Both counting and size measurement in fluorescence imaging mode depend on the intensity of the light received at the camera. The intensity is dependent on the brightness of the light source, the transmission efficiency of the filters, and the fluorescent intensity of the cells themselves. Fluorescently-labeled cells exhibit a distribution of emitted intensities. If segmentation of cells from the background is done using an intensity threshold, the number of counted cells will vary with the intensity of the excitation light. If the same threshold is set for analysis of experiments done under different lighting conditions, the counts will vary for this reason alone. Well-controlled fluorescent objects or features incorporated into the counting device allows for normalization of intensity to the markers, leading to better counting consistency from experiment to experiment and instrument to instrument. It also allows for comparison between experiments done with different exposure times.

Figure 5:
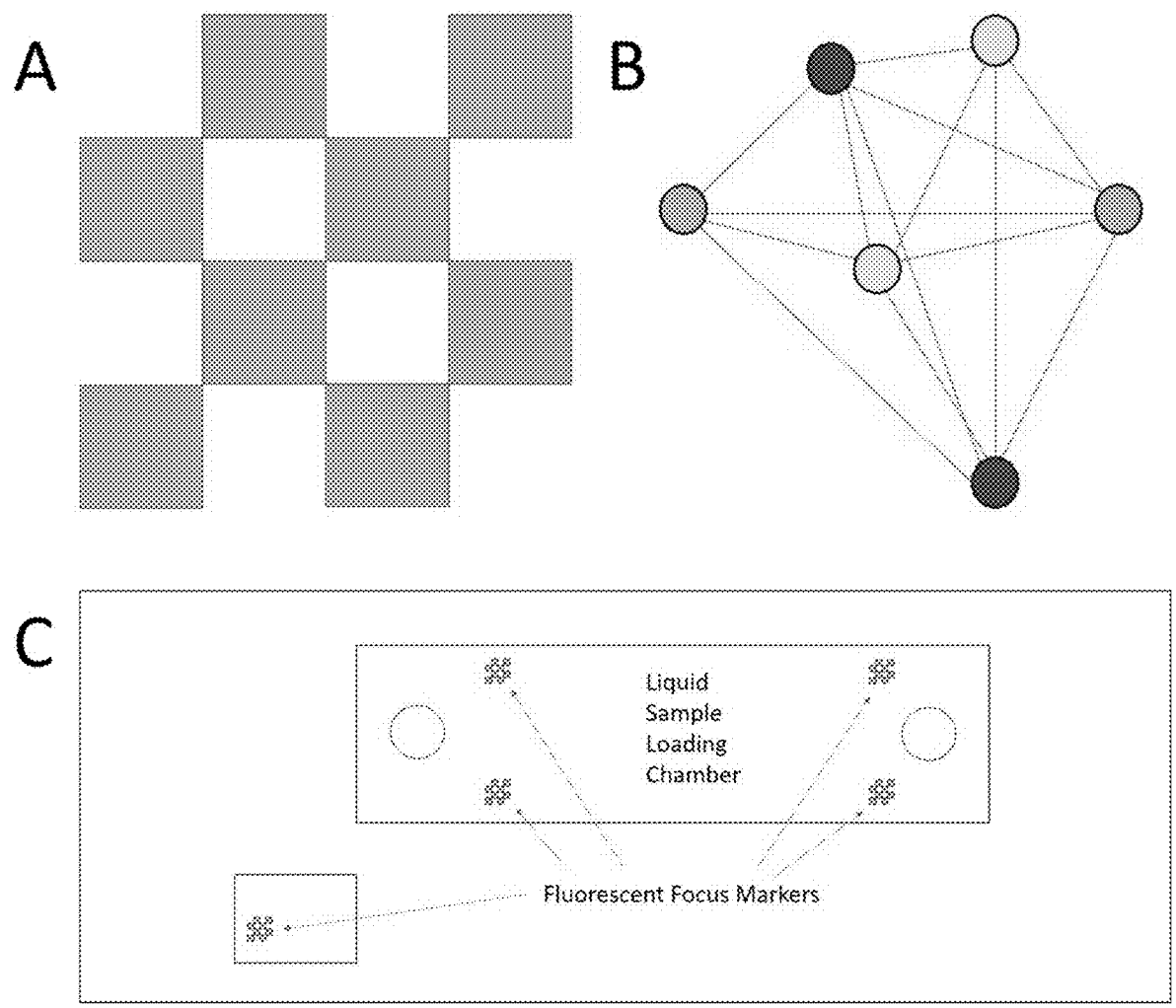
FIG. 5. Schematic illustration of exemplary markings or features for cell fluorescence calibration or assessment.

For example, as schematically illustrated in FIG. 5, with objects or features of well-characterized fluorescence embedded or added to the cell-counting chamber or slide, the intensity of imaged cells can be related or normalized to the brightness of the objects or features. This allows for comparison of results between instruments and experiments. The system instrument can also utilize these features to provide a simple confirmation that the illumination is working properly so that low or non-existent cell counts can be confidently ascribed to the sample rather than the instrument.

FIG. 5 shows two simple patterns for fluorescent features. In FIG. 5A, a fluorescent checkerboard is provided which allows for calibration of scale (e.g., size and/or spacing of squares), fluorescent intensity (e.g., using brightness of fluorescent coating), and focus. FIG. 5B shows an alternative pattern of variously-colored fluorescent dots of known sizes. Multiple dot colors allow for calibration of multiple fluorescent channels (brightness and focus position). In addition, known distances between pairs of dots provide scale calibration and an origin for spatial coordinates. In FIG. 5C, multiple small markings are placed at locations around the counting chamber. Markers in multiple fluorescent colors also allow for finding focal planes for the different wavelengths. To reduce manufacturing costs of such features, well-characterized fluorescent beads can be utilized in lien of direct markings on the cell chambers.

Combined Markings for Multiplexed Calibration and Measurement Assurance

Focus registration, proportionality verification, size calibration, and fluorescence intensity benchmarking may be accomplished together. For example, objects or features of known sizes may be printed on the bottom external surface of the slide in fluorescent ink. The system instrument can focus on the objects or features and apply a known offset to move focus to the focal plane of the cells. The system instrument can check that the intensity of fluorescent features falls within specification and adjust the brightness of the light source or the gain of the camera in order to compensate if necessary. It may also check certain distances measured between the objects or features to verify that calibration of the images is within acceptable bounds. Such markings can be etched, printed, or otherwise added to the cell counting chambers (e.g., imprint lithography).

Thus, in one aspect, the invention generally relates to a sample chamber suitable for holding a liquid sample for optical imaging. The sample chamber comprises: (a) an inlet for introducing the liquid sample into the sample chamber for observation or analysis; (b) an imaging chamber for holding the liquid sample, wherein the imaging chamber is in fluid communication with the inlet and comprises one or more optically transparent windows suitable for observation or analysis of the liquid sample inside the imaging chamber; and (c) an outlet in fluid communication with the imaging chamber for air escape or outflow of the liquid sample. The imaging chamber is characterized by one or more of: a varying chamber height, either continuous or step-wise, traversing at least a portion of the one or more optically transparent windows, defined features having one or more known offsets from a focal plane of the imaging chamber, wherein the features are optically accessible via the one or more optically transparent windows, defined features having one or more known dimensions, areas or volumes, wherein the features are optically accessible via the one or more optically transparent windows, and the defined features exhibit one or more fluorescent colors in one or more intensities.

In certain embodiments, at least a portion of the chamber height is continuously varied.

In certain embodiments, at least a portion of the chamber height is step-wisely varied.

In certain embodiments, the chamber height is both continuously varied and step-wise varied (partly continuously varied and partly step-wise varied).

In certain embodiments, the chamber height varies in the range from about 1 µm to about 5,000 µm (e.g., from about 1 µm to about 5,000 µm, from about 5 µm to about 5,000 µm, from about 10 µm to about 5,000 µm, from about 50 µm to about 5,000 µm, from about 100 µm to about 5,000 µm, from about 500 µm to about 5,000 µm, from about 1 µm to about 1,000 µm, from about 1 µm to about 500 µm, from about 1 µm to about 100 µm, from about 1 µm to about 50 µm, from about 1 µm to about 10 µm).

In certain embodiments, the chamber height varies in the range from about 10 µm to about 500 µm (e.g., about 10 µm to about 500 µm, about 25 µm to about 500 µm, about 50 µm to about 500 µm, about 100 µm to about 500 µm, about 10 µm to about 250 µm, about 10 µm to about 100 µm, about 10 µm to about 50 µm, about 10 µm to about 25 µm).

In certain embodiments, at least some of the defined features are 3-dimensional characterized by one or more defined feature heights.

In certain embodiments, all of the defined features are 3-dimensional characterized by one or more defined feature heights.

In certain embodiments, the one or more defined feature heights are the same.

In certain embodiments, the one or more defined feature heights are different.

In certain embodiments, the one or more defined feature heights are in the range from about 0.1 μm to about 5,000 μm (e.g., from about 0.1 μm to about 1,000 μm, from about 0.1 μm to about 500 μm, from about 0.1 μm to about 200 μm, from about 0.1 μm to about 100 μm, from about 0.1 μm to about 50 μm, from about 0.1 μm to about 25 μm, from about 0.1 μm to about 10 μm, from about 0.1 μm to about 5 μm, from about 0.1 μm to 1 μm, from about 1 μm to about 5,000 μm, from about 10 μm to about 5,000 μm, from about 50 μm to about 5,000 μm, from about 100 μm to about 5,000 μm, from about 500 μm to about 5,000 μm, from about 1,000 μm to about 5,000 μm, from about 1 μm to about 500 μm, from about 2 μm to about 200 μm, from about 2 μm to about 100 μm, from about 5 μm to about 100 μm, from about 5 μm to about 50 μm).

In certain embodiments, the defined features having one or more known offsets are inscribed on the bottom of the imaging chamber.

In certain embodiments, the defined features having one or more known offsets are inscribed on the ceiling of the imaging chamber.

In certain embodiments, the defined features having one or more known dimensions, areas or volumes are inscribed on the bottom of the imaging chamber.

In certain embodiments, the defined features having one or more known dimensions, areas or volumes are inscribed on the ceiling of the imaging chamber.

In certain embodiments, the defined features comprise a plurality of coarse and fine features.

In certain embodiments, the defined features exhibit one or more pre-defined patterns.

In certain embodiments, the defined features exhibit one or more fluorescent colors and/or in one or more fluorescent intensities.

In certain embodiments, the imaging chamber is configured to have a volume in the range of about 0.1 μL to about 200 μL (e.g., about 0.5 μL to about 200 μL, about 1 μL to about 200 μL, about 10 μL to about 200 μL, about 50 μL to about 200 μL, about 0.1 μL to about 100 μL, about 0.1 μL to about 50 μL, about 0.1 μL to about 20 μL, about 0.1 μL to about 10 μL, about 0.1 μL to about 5 μL, about 0.1 μL to about 1 μL).

In certain embodiments, the imaging chamber is configured to have a volume in the range of about 4 μL to about 100 μL (e.g., about 10 μL to about 100 μL, about 20 μL to about 100 μL, about 50 μL to about 100 μL, about 4 μL to about 50 μL, about 4 μL to about 20 μL, about 4 μL to about 10 μL).

In certain embodiments, the imaging chamber is equipped with a single optically transparent window.

In certain embodiments, wherein the imaging chamber is equipped with two or more optically transparent windows.

In certain embodiments, the imaging chamber is equipped with three, four or five optically transparent windows.

In another aspect, the invention generally relates to a sample analysis unit. The sample analysis unit comprises: (i) a mixing well for preparation of a liquid sample for analysis; and (ii) a sample chamber disclosed here that is deposed in spatial proximity to the mixing well.

In yet another aspect, the invention generally relates to a sample analysis unit. The sample analysis unit comprises: (i) a mixing well for preparation of a liquid sample for analysis; and (ii) a first sample chamber suitable for holding a liquid sample for optical imaging. The first sample chamber comprises: (a) a first inlet for introducing the liquid sample into the first sample chamber for observation or analysis; (b) a first imaging chamber for holding the liquid sample, wherein the first imaging chamber is in fluid communication with the first inlet and comprises a first or first set of optically transparent window(s) suitable for observation or analysis of the liquid sample inside the first imaging chamber; and (c) a first outlet in fluid communication with the first imaging chamber for air escape or outflow of the liquid sample. The first imaging chamber is characterized by one or more of: (i) a varying first chamber height, either continuous or stepwise, traversing at least a portion of the first or first set of optically transparent window(s), (ii) first defined features having one or more known offsets from a focal plane of the first imaging chamber, wherein the features are optically accessible via the first or first set of optically transparent window(s), (iii) first defined features having one or more known dimensions, areas or volumes, wherein the first features are optically accessible via the first or first set of optically transparent window(s), and (iv) the first defined features exhibit one or more fluorescent colors in one or more intensities.

In certain embodiments, the sample analysis unit further comprises a second sample chamber suitable for holding a liquid sample for optical imaging. The second sample chamber comprises: (a) a second inlet for introducing the liquid sample into the second sample chamber for observation or analysis; (b) a second imaging chamber for holding the liquid sample, wherein the second imaging chamber is in fluid communication with the second inlet and comprises a second or second set of optically transparent window(s) suitable for observation or analysis of the liquid sample inside the second imaging chamber; and (c) a second outlet in fluid communication with the second imaging chamber for air escape or outflow of the liquid sample. The second imaging chamber is characterized by one or more of: (i) a varying second chamber height, either continuous or stepwise, traversing at least a portion of the second or second set of optically transparent window(s), (ii) second defined features having one or more known offsets from a focal plane of the second imaging chamber, wherein the second features are optically accessible via the second or second set of optically transparent window(s), (iii) second defined features having one or more known dimensions, areas or volumes, wherein the second features are optically accessible via the second or second set of optically transparent window(s), and (iv) the second defined features exhibit one or more fluorescent colors in one or more intensities.

In certain embodiments, the sample analysis unit further comprises a third sample chamber suitable for holding a liquid sample for optical imaging. The third sample chamber comprises: (a) a third inlet for introducing the liquid sample into the third sample chamber for observation or analysis; (b) a third imaging chamber for holding the liquid sample, wherein the third imaging chamber is in fluid communication with the third inlet and comprises a third or third set of optically transparent window(s) suitable for observation or analysis of the liquid sample inside the third imaging chamber; and (c) a third outlet in fluid communication with the third imaging chamber for air escape or outflow of the liquid sample. The third imaging chamber is characterized by one or more of: (i) a varying third chamber height, either continuous or step-wise, traversing at least a portion of the third or third set of optically transparent window(s), (ii) third defined features having one or more known offsets from a focal plane of the third imaging chamber, wherein the third features are optically accessible via the third or third set of optically transparent window(s), (iii) third defined features having one or more known dimensions, areas or volumes, wherein the third features are optically accessible via the third or third set of optically transparent window(s), and (iv) the third defined features exhibit one or more fluorescent colors in one or more intensities.

In certain embodiments, the sample analysis unit further comprises a fourth sample chamber suitable for holding a liquid sample for optical imaging. The fourth sample chamber comprises: (a) a fourth inlet for introducing the liquid sample into the fourth sample chamber for observation or analysis; (b) a fourth imaging chamber for holding the liquid sample, wherein the fourth imaging chamber is in fluid communication with the fourth inlet and comprises a fourth or fourth set of optically transparent window(s) suitable for observation or analysis of the liquid sample inside the fourth imaging chamber; and (c) a fourth outlet in fluid communication with the fourth imaging chamber for air escape or outflow of the liquid sample. The fourth imaging chamber is characterized by one or more of: (i) a varying fourth chamber height, either continuous or step-wise, traversing at least a portion of the fourth or fourth set of optically transparent window(s), (ii) fourth defined features having one or more known offsets from a focal plane of the fourth imaging chamber, wherein the fourth features are optically accessible via the fourth or fourth set of optically transparent window(s), (iii) fourth defined features having one or more known dimensions, areas or volumes, wherein the fourth features are optically accessible via the fourth or fourth set of optically transparent window(s), and (iv) the fourth defined features exhibit one or more fluorescent colors in one or more intensities.

In certain embodiments, the sample analysis unit further comprises one or more additional sample chambers suitable for holding a liquid sample for optical imaging.

In certain embodiments of the sample analysis unit, the first, second, third, fourth and any additional inlets all share the same inlet.

In certain embodiments, each of the first, second, third, fourth, and any additional imaging chambers is characterized by a uniform chamber height while the first, second, third, fourth and any additional imaging chambers have different chamber heights.

In certain embodiments, each of the first, second, third, fourth and any additional imaging chambers is characterized by a non-uniform chamber height.

In certain embodiments, the first, second, third, fourth and any additional defined features are the same.

In certain embodiments, the first, second, third, fourth and any additional defined features are different.

In certain embodiments, each of the imaging chambers is configured to have a volume of about 0.1 µL to about 200 µL (e.g., about 0.5 µL to about 200 µL, about 1 µL to about 200 µL, about 10 µL to about 200 µL, about 50 µL to about 200 µL, about 0.1 µL to about 100 µL, about 0.1 µL to about 50 µL, about 0.1 µL to about 20 µL, about 0.1 µL to about 10 µL, about 0.1 µL to about 5 µL, about 0.1 µL to about 1 µL).

In certain embodiments, each of the imaging chambers is configured to have a volume of about 4 µL to about 100 µL (e.g., about 10 µL to about 100 µL, about 20 µL to about 100 µL, about 50 µL to about 100 µL, about 4 µL to about 50 µL, about 4 µL to about 20 µL, about 4 µL to about 10 µL).

In certain embodiments, each of the first or first set of optically transparent window(s), the second or second set of optically transparent window(s), the third or third set of optically transparent window(s), and the fourth or fourth set of optically transparent window(s) comprise a single optically transparent window.

In certain embodiments, each of the first or first set of optically transparent window(s), the second or second set of optically transparent window(s), the third or third set of optically transparent window(s), and the fourth or fourth set of optically transparent window(s) comprise two or more optically transparent windows.

In certain embodiments, each of the first or first set of optically transparent window(s), the second or second set of optically transparent window(s), the third or third set of optically transparent window(s), and the fourth or fourth set of optically transparent window(s) comprise three, four or five optically transparent windows.

In yet another aspect, the invention generally relates to a multi-well plate or device comprising a sample analysis unit disclosed herein.

In yet another aspect, the invention generally relates to a multi-well plate comprising a plurality of sample analysis units, wherein each sample analysis unit comprises: (i) a mixing well for preparation of a liquid sample for analysis; and (ii) one or more sample chambers suitable for holding a liquid sample for optical imaging. Each sample chamber comprises: (a) an inlet for introducing the liquid sample into the sample chamber for observation or analysis; (b) an imaging chamber for holding the liquid sample, wherein the imaging chamber is in fluid communication with the inlet and comprises one or more optically transparent windows suitable for observation or analysis of the liquid sample inside the imaging chamber; and (c) an outlet in fluid communication with the imaging chamber for air escape or outflow of the liquid sample. The imaging chamber is characterized by: defined features having one or more known offsets from a focal plane of the imaging chamber, wherein the features are optically accessible via the one or more optically transparent windows, and/or defined features having one or more known dimensions, areas or volumes, wherein the features are optically accessible via the one or more optically transparent windows. The defined features exhibit one or more fluorescent colors in one or more intensities.

In certain embodiments, the multi-well plate comprises 2 or more sample analysis units. In certain embodiments, the multi-well plate comprises 4 or more sample analysis units. In certain embodiments, the multi-well plate comprises 6 or more sample analysis units. In certain embodiments, the multi-well plate comprises 8 or more sample analysis units. In certain embodiments, the multi-well plate comprises 10 or more sample analysis units. In certain embodiments, the multi-well plate comprises 12 or more sample analysis units.

In certain embodiments of the multi-well plate, each of the sample analysis units comprises 2 or more sample chambers. In certain embodiments of the multi-well plate, each of the sample analysis units comprises 3 or more sample chambers. In certain embodiments of the multi-well plate, each of the sample analysis units comprises 4 or more sample chambers.

In certain embodiments of the multi-well plate, all of the defined features are the same.

In certain embodiments, all of the defined features are not the same.

In certain embodiments, each of the imaging chambers is configured to have a volume of about 0.1 µL to about 200 µL (e.g., about 0.5 µL to about 200 µL, about 1 µL to about 200 µL, about 10 µL to about 200 µL, about 50 µL to about 200 µL, about 0.1 µL to about 100 µL, about 0.1 µL to about 50 µL, about 0.1 µL to about 20 µL, about 0.1 µL to about 10 µL, about 0.1 µL to about 5 µL, about 0.1 µL to about 1 µL).

In certain embodiments, each of the imaging chambers is configured to have a volume of about 4 µL to about 100 µL (e.g., about 10 µL to about 100 µL, about 20 µL to about 100 µL, about 50 µL to about 100 µL, about 4 µL to about 50 µL, about 4 µL to about 20 µL, about 4 µL to about 10 µL).

In yet another aspect, the invention generally relates to a system for analyzing biological samples, comprising a sample analysis unit or a multi-well plate disclosed herein.

In certain embodiments, the system further comprises: at least one fluorescent light source; at least one bright-field light source; at least one optical system for light beam narrowing of the fluorescent light beam and/or the bright-field light beam; a detection device; and a computing unit.

In certain embodiments, the system comprises two or more fluorescent light sources.

In certain embodiments, the system comprises two or more bright-field light sources.

In yet another aspect, the invention generally relates to a method for assessing a focus setting of an imaging system for cell-counting analysis. The method comprises: adjusting the focus position until one or more defined features of the imaging chamber appear in the best focus; recording the focus position according to the defined features; adjusting the focus position until cells of a sample appear in the best focus; recording the focus position according to the sample; performing cell counting measurement; comparing the recorded focus positions according to the defined features and according to the sample; and determining if the difference between the two recorded focus positions is acceptable to confirm or reject the cell counting measurement.

In yet another aspect, the invention generally relates to a method for assessing a focus setting of an imaging system for cell-counting analysis. The method comprises: adjusting manually or automatically the focus position until one or more defined features of the imaging chamber appear in the best focus; recording the focus position according to the defined features; adjusting manually or automatically the focus to an attempted cell focus position at which the cells are presumed to be in best focus for cell counting; recording the attempted cell focus position according to the sample; performing image acquisition for cell count measurement; comparing the recorded focus positions according to the defined features and according to the sample; and determining if the difference between the two recorded focus positions is acceptable to confirm or reject the cell counting measurement.

In certain embodiments, in the event of rejection of the cell counting measurement, the method further comprises: adjusting manually or automatically the focus to a new attempted cell focus position at which the cells are presumed to be in best focus for cell counting; recording the new attempted cell focus position according to the sample; performing image acquisition for cell count measurement; comparing the recorded focus positions according to the defined features and according to the sample; and determining if the difference between the two recorded focus positions is acceptable to confirm or reject the cell counting measurement; and repeating focus adjustment as necessary to produce an acceptable focus position.

In yet another aspect, the invention generally relates to a method for obtaining a focus setting of an imaging system for cell-counting analysis. The method comprises: adjusting manually or automatically the focus position until one or more defined features of the imaging chamber appear in best focus; adjusting the focus position manually or automatically by a predefined offset from the focus position of the one or more defined features; and performing image acquisition for the cell counting measurement.

In yet another aspect, the invention generally relates to a method for calibrating cell size measurement of an imaging system for cell-counting analysis. The method comprises: measuring sizes of cells in a sample; measuring sizes of one or more defined features of the imaging chamber having known sizes; comparing the measured sizes of the defined features to their known sizes; determining a calibration factor based on the comparison of the known sizes and measured sizes of the features; applying the calibration factor in cell size measurement; and reporting the adjusted values of cell size measurement.

In yet another aspect, the invention generally relates to a method for assessing a cell size measurement of an imaging system for cell-counting analysis. The method comprises: measuring sizes of cells in a sample; measuring sizes of one or more defined features of the imaging chamber having known sizes; comparing the measured sizes and the known sizes of the defined features; and determining if the difference between the measured sizes and known sizes of the features is acceptable to confirm or reject the cell size measurement.

In certain embodiments, in the event of rejection of the cell size measurement, the method further comprises: adjusting manually or automatically one or more instrument settings; measuring sizes of cells in a sample; measuring sizes of one or more defined features of the imaging chamber having known sizes; comparing the measured sizes of the defined features to their known sizes; determining if the difference between the measured sizes and known sizes of the features is acceptable to confirm or reject the cell size measurement; and repeating these steps until an acceptable size measurement is obtained.

In yet another aspect, the invention generally relates to a method for simultaneously assessing focus and cell size measurement of an imaging system for cell-counting analysis. The method comprises: adjusting manually or automatically the focus position until one or more defined features of the imaging chamber appear in the best focus; measuring sizes of cells in a sample; measuring sizes of one or more defined features of the imaging chamber having known sizes; comparing the measured sizes of the defined features to their known sizes; determining if the difference between the two measurements is acceptable to confirm or reject the setting for focus and cell size measurement; and repeating these steps until an acceptable size measurement is obtained.

In yet another aspect, the invention generally relates to a method for assessing a sample for suitability for cell-counting analysis without diluting or concentrating the sample of the sample. The method comprises: providing a sample in one or more sample chambers having a plurality of chamber heights; recording cell counts of the sample at a plurality of chamber heights, and comparing the recorded cell counts to determine if they are proportional to the chamber heights to confirm or reject the cell count measurement.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights, and analyzing the recorded cell count measurements to determine chamber heights at which cell count measurements are proportional to the chamber heights to confirm the corresponding cell count measurements.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights, and analyzing the recorded cell count measurements to determine the range of cell counts at which cell count measurements are proportional to the chamber heights to confirm the corresponding cell count measurements.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights; analyzing the recorded cell count measurements to determine which of the measurements are proportional to the known chamber heights; and confirming the cell count measurements that are sufficiently proportional to chamber height and rejecting those that are not.

In yet another aspect, the invention generally relates to a method for cell count measurement and analysis without diluting or concentrating the sample. The method comprises: providing a sample in one or more sample chambers having a plurality of chamber heights; recording cell counts of the sample at the plurality of chamber heights, and scoring the obtained cell count measurements based on how well the counts match expected values for the known chamber height; and confirming those measurements that meet predetermined specifications and rejecting those that do not.

In certain embodiments, the method further comprises discarding cell count measurements recorded at chamber heights at which cell count measurements are not proportional to the chamber heights.

In certain embodiments, the method further comprises discard cell count measurements recorded at chamber heights at which cell count measurements are not proportional to the chamber heights. In certain embodiments, the method further comprises generating one or more quality scores for the cell count measurements based on the proportionality results. For example, there are six different chamber heights in a device, the measurement of a sample that gives proportional counts across all six chamber heights is of higher quality than another measurement that discards three of the six chamber heights due to disproportionality.

In yet another aspect, the invention generally relates to a method for calibrating a fluorescence measurement of an imaging system for cell-counting analysis. The method comprises: measuring fluorescence of cells in a sample; measuring fluorescence of one or more defined features of the imaging chamber having known fluorescence; comparing the measured fluorescence of the defined features to their known fluorescence; determining a calibration factor based on the comparison of measured fluorescence and known fluorescence of the defined features; applying the calibration factor in fluorescence measurement of the cells; and reporting the adjusted values of fluorescence measurement.

In yet another aspect, the invention generally relates to a method for assessing a fluorescence measurement of an imaging system for cell-counting analysis. The method comprises: measuring fluorescence of cells in a sample; measuring fluorescence of one or more defined features of the imaging chamber having known fluorescence; and comparing the measured fluorescence of the defined features and their known fluorescence to confirm or reject the fluorescence measurement.

In certain embodiments, in the event of rejection of the fluorescence measurement, the method further comprises: adjusting manually or automatically one or more instrument settings; measuring fluorescence of cells in a sample; measuring fluorescence of one or more defined features of the imaging chamber having known fluorescence; comparing the measured fluorescence of the defined features and the known fluorescence of the defined features to confirm or reject the fluorescence measurement; and repeating these steps until the fluorescence measurement of the defined features is acceptable.

In yet another aspect, the invention generally relates to a method for calibrating and/or assessing a cell-counting analysis, comprising performing calibration or assessment according to one or more of methods disclosed herein.

In certain embodiments, at least some of the one or more defined features are 3-dimensional characterized by one or more defined feature heights.

In certain embodiments, all of the defined features are 3-dimensional characterized by one or more defined feature heights.

In certain embodiments, the one or more defined feature heights are the same.

In certain embodiments, the one or more defined feature heights are different.

In certain embodiments, the one or more defined feature heights are in the range from about 0.1 µm to about 5,000 µm (e.g., from about 0.1 µm to about 1,000 µm, from about 0.1 µm to about 500 µm, from about 0.1 µm to about 200 µm, from about 0.1 µm to about 100 µm, from about 0.1 µm to about 50 µm, from about 0.1 µm to about 25 µm, from about 0.1 µm to about 10 µm, from about 0.1 µm to about 5 µm, from about 0.1 µm to 1 µm, from about 1 µm to about 5,000 µm, from about 10 µm to about 5,000 µm, from about 50 µm to about 5,000 µm, from about 100 µm to about 5,000 µm, from about 500 µm to about 5,000 µm, from about 1,000 µm to about 5,000 µm, from about 1 µm to about 500 µm, from about 2 µm to about 200 µm, from about 2 µm to about 100 µm, from about 5 µm to about 100 µm, from about 5 µm to about 50 µm).

In certain embodiments, the defined features are inscribed on the bottom of the imaging chamber.

In certain embodiments, the defined features having one or more known offsets are inscribed on the ceiling of the imaging chamber.

In certain embodiments, the defined features having one or more known dimensions, areas or volumes are inscribed on the bottom of the imaging chamber.

In certain embodiments, the defined features having one or more known dimensions, areas or volumes are inscribed on the ceiling of the imaging chamber.

In certain embodiments, the defined features comprise a plurality of coarse and fine features.

In certain embodiments, the defined features exhibit one or more pre-defined patterns or geometrical shapes.

In certain embodiments, the defined features exhibit one or more fluorescent colors and/or one or more of fluorescent intensities.

In certain embodiments, the imaging chamber is configured to have a volume of about 0.1 µL to about 200 µL (e.g., about 0.5 µL to about 200 µL, about 1 µL to about 200 µL, about 10 µL to about 200 µL, about 50 µL to about 200 µL, about 0.1 µL to about 100 µL, about 0.1 µL to about 50 µL, about 0.1 μL to about 20 μL, about 0.1 μL to about 10 μL, about 0.1 μL to about 5 μL, about 0.1 μL to about 1 μL).

In certain embodiments, the imaging chamber is configured to have a volume of about 4 μL to about 100 μL (e.g., about 10 μL to about 100 μL, about 20 μL to about 100 μL, about 50 μL to about 100 μL, about 4 μL to about 50 μL, about 4 μL to about 20 μL, about 4 μL to about 10 μL).

In yet another aspect, the invention generally relates to a method for cell count measurement using a sample chamber disclosed herein, a sample analysis unit disclosed herein, a multi-well plate disclosed herein, or a system for analyzing biological samples disclosed herein.

The invention is well suited for high-throughput cell counter instrumentation and associated software that possess self-calibration and measurement assurance capabilities. An example of such a system utilizes a transmission bright field channel, five excitation filters (375, 475, 530, 540, 630 nm) and six emission filters (450, 525, 600, 610LP, 660, 695) for epi-fluorescent channels. It also uses infinity-corrected optical objectives for high-resolution high-quality imaging. The exemplary system allows X-Y-Z motion to image and analyze cells in standard microplates (6-1536 wells), T25 and T75 flasks, as well as glass and chamber slides. It improves cell counting time to 24 samples/min for bright field analysis (trypan blue) and 24 samples/3 min for fluorescence analysis (acridine orange and propidium iodide).

In addition, the instrument can be integrated with liquid handler to perform fully automated high-throughput cell counting process.

The exemplary system is built with software that is designed to image and analyze different consumable type such as cell counting plate disclosed herein, standard microplates from 6-1536-well, glass slides, T75, T25 flasks, chamber slides. It may be utilized to measure cell concentration, cell size and morphology such as perimeter, circularity, area, major/minor axis, compactness, elongation, eccentricity, sphericity, convexity, aspect ratio, solidity. It can measure fluorescent intensities for fluorescence-based assays. Additional add-on is for full automation to integrate with plate handler, liquid handler for high-throughput cell counting and analysis.

The software analyzes the captured images to determine cell concentrations, cell size and morphology, fluorescently labeled population percentages such as labels for viability (Acridine Orange, Propidium Iodide (PI), 4',6-diamidino-2-phenylindole (DAPI), Hoechst, 7-Aminoactinomycin D (7AAD), Sytox Green, Sytox Red, DRAQS/7, nuclear green/red/blue/far red, trypan blue, etc.); transduction efficiency (green fluorescent protein (GFP), red fluorescent protein (RFP), mCherry, blue fluorescent protein (BFP), mCardinal, yellow fluorescent protein (YFP), Cyan fluorescent protein (CFP), etc.); apoptosis (Annexin V-FITC, -PE and PI, or Caspase 3/7); autophagy (LC3II-FITC, -GFP); cell cycle (PI, Hoechst, DAPI, BrdU (bromodeoxyuridine), EdU (5-ethynyl-2'-deoxyuridine)); senescence (Beta-Gal-Green); vitality (Calcein AM, CFDA-AM (5-Carboxyfluorescein diacetate acetoxymethyl ester), FDA (Fluorescein diacetate), CFDA); ROS; mitochondrial Potential and health; surface marker staining and intracellular staining.

A system according to the invention can be designed to perform assays for oncology, immuno-oncology, virology, cell therapy, cell line development, regenerative medicine (stem cell research), brewing science and renewable energy. It may be utilized to analyze cell lines (NCI-60 cancer cells and other), primary cells (PBMCs, splenocytes, leukapheresis, apheresis, thymocytes, stem cells, platelets, red blood cells, yeast, and algae, CHO cells, etc. The system can be used to perform assays such as cell growth and proliferation, viability, cell size change by activation, transduction efficiency, apoptosis, autophagy, cell cycle, senescence, ROS, mitochondrial potential and health, surface marker population analysis, intracellular staining population analysis, etc.

In addition, the system can determine population percentages based on size, morphology, or fluorescent labeling. By identifying total cell count with bright field or any other fluorescent channels, the ratio of the population can be determined by comparing the number of cell count or concentration of target cell population based on size, morphology, or fluorescent labeling.

The following examples are meant to be illustrative of the practice of the invention and not limiting in any way.

Figure 10:
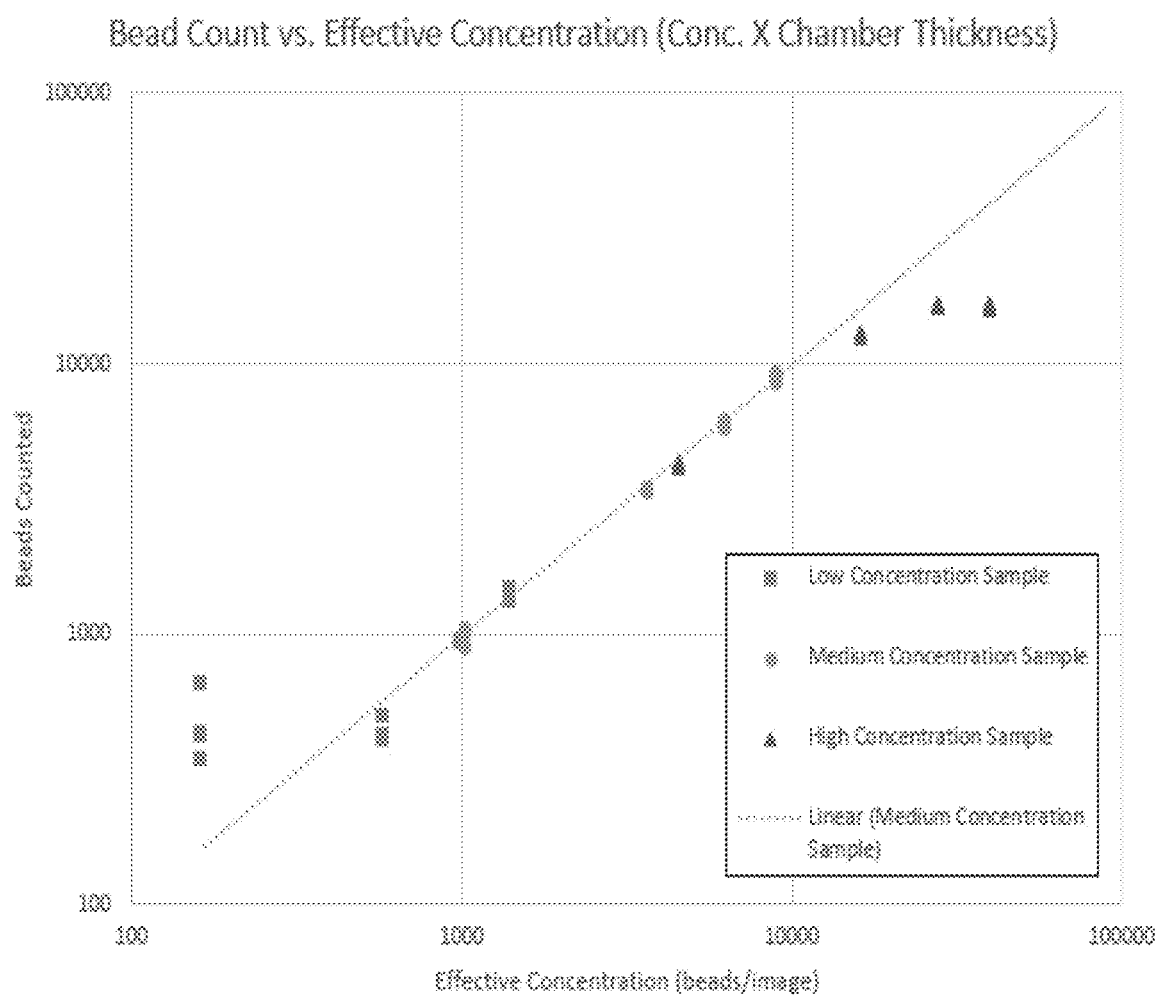
FIG. 10. Exemplary demonstration of bead counting proportionality to effective concentration using the device in FIG. 9.

FIG. 10 shows exemplary results obtained using the device in FIG. 9 and samples of bead solution with three different concentrations. The number of beads counting in the image is plotted against an effective concentration, which is the real concentration of the sample multiplied by the thickness of the chamber. Deviations from proportionality can be seen at the high and low ends of the effective concentration range. The counts for the low and high concentration samples could thus be rejected. With a sufficient number of counts that fall within the linear range, the samples may be recounted with the non-linear points removed and a confirmed count value returned. The multiple chamber thicknesses also provide the ability to increase the range of concentrations an instrument is able to reliably measure.

Figure 11:
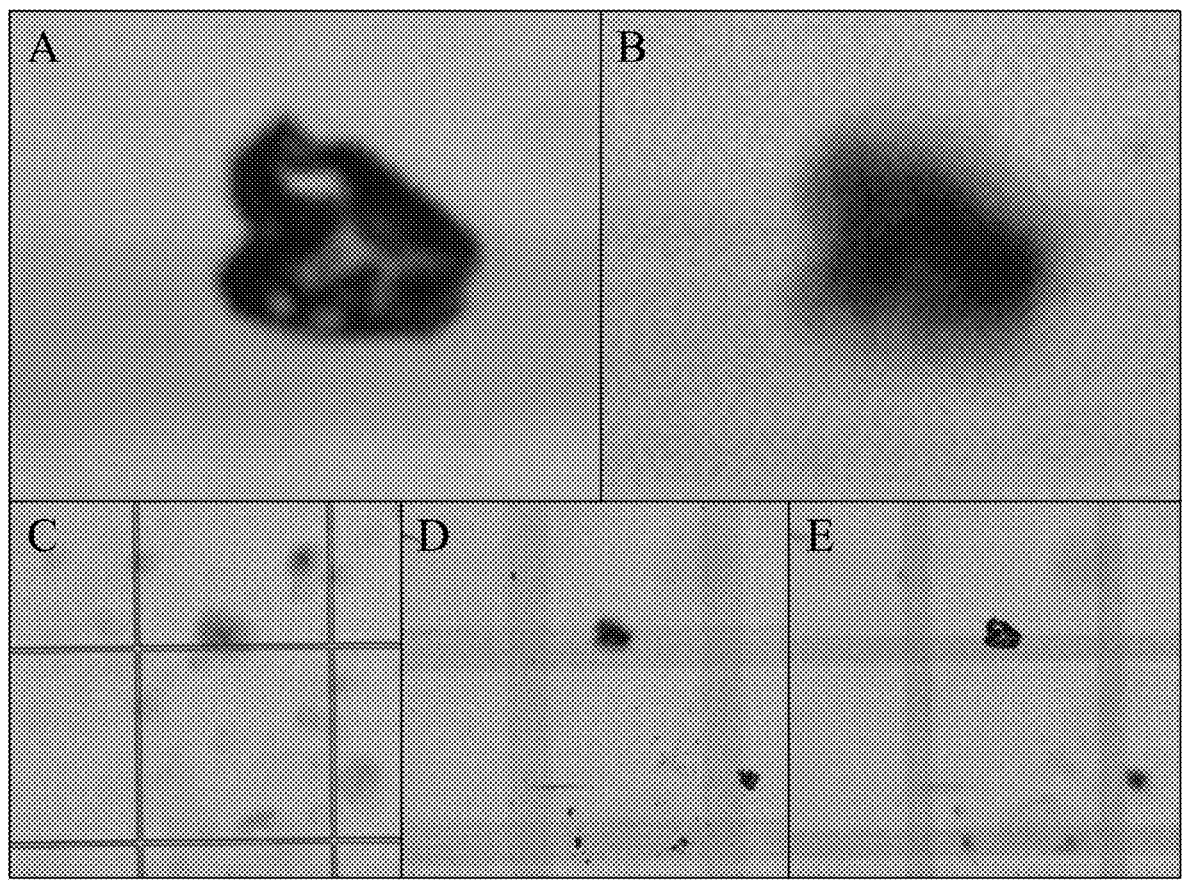
FIG. 11. Exemplary demonstration of focus positions and obtained images.

In FIG. 11, varied focus positions can be seen to lead to varied images of the imaged objects. In (A), the goal is to image a microscopic object so that the surface detail can be seen. The object is resting on a transparent surface, but if the focus is on the surface itself, the details become washed out (B). For example, the goal for similar objects of this size is to focus at 182 μm away from the surface. Features are easily recognizable (grid lines, panel C) at a plane known to be 548 μm from the surface that the object of interest is resting on. The focus can be reliably placed on the grid, and note the position of the objective lens once the grid is focused. The objective lens can then be moved by an offset of 548 μm to get to the sample surface and an additional 182 μm to get to best focus for the object (total offset 730 μm). If a focusing algorithm becomes confused by dirt and scratches, and mistakenly focuses at the wrong position for imaging either the grid or the object (D), there will be a reported focus offset that differs too much from the expected 730 μm and the focus will be rejected.

Figure 12:
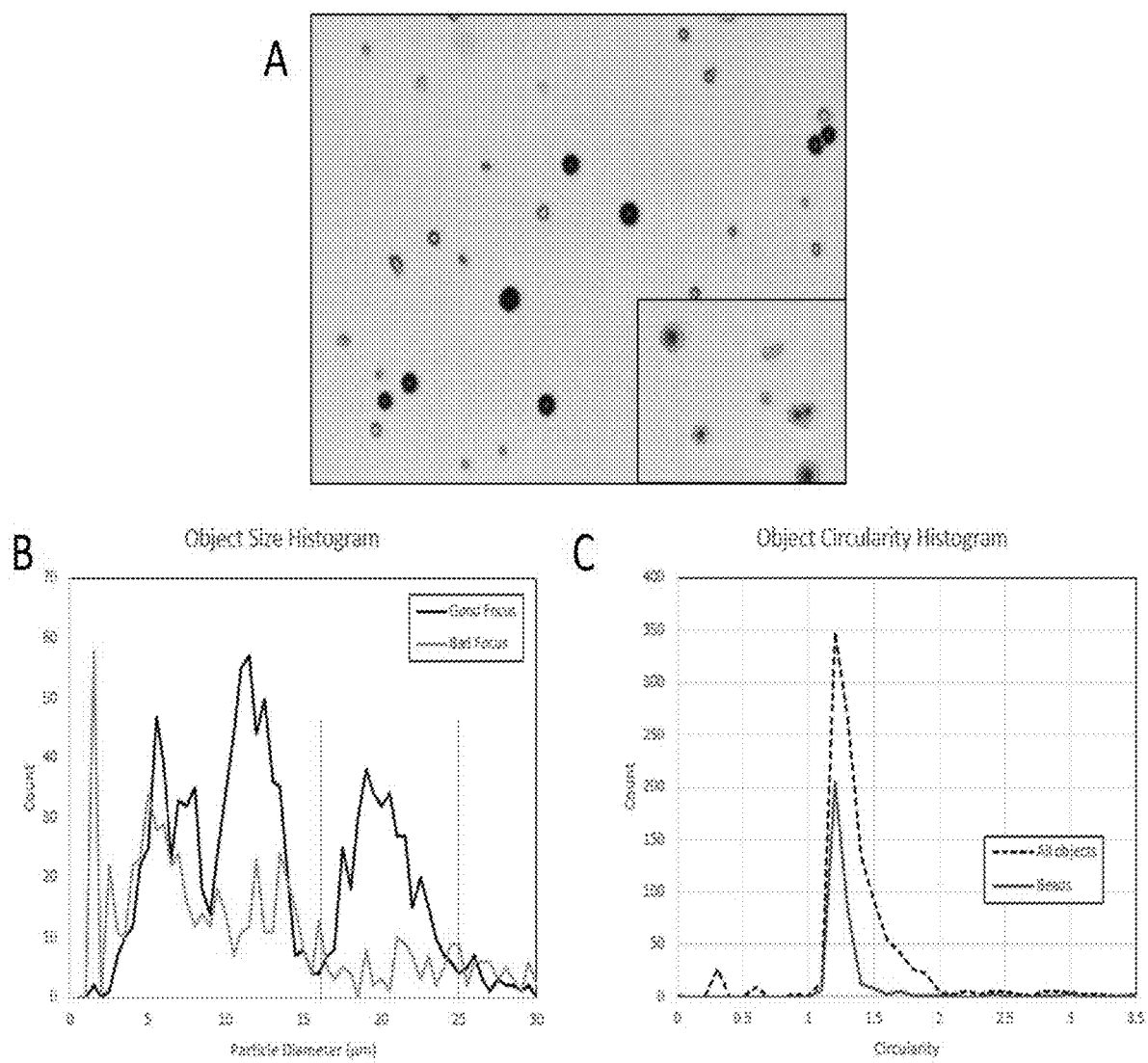
FIG. 12. Exemplary demonstration of imaged objects and size and circularity histograms.

Exemplary demonstration of imaged objects and size and circularity histograms are shown in FIG. 12. Panel A shows a portion of an image of a Jurkat cell suspension mixed with borosilicate glass beads of known size. The inset shows a region of an image of the same sample that was slightly defocused. The beads have a certified mean diameter of 17.3 μm, with a standard deviation of 2.0 μm. The objects found by the algorithm are highlighted in green. The size histogram of the objects identified in the image with good focus is given in B. The peak at 20 μm is corresponding to the beads. The beads were selected using a gate from 16 to 25 μm. For these objects, the algorithm returned a mean diameter of 19.96 μm, with a standard deviation of 1.94 μm.

The results indicated that the algorithm was reporting a size that is approximately 15% larger than the actual size of the features (beads). The reported size of the cells may also be affected in a similar manner. Also plotted in B is the histogram of object sizes found by the algorithm in the entire defocused image of the sample. The clear peak corresponding to the beads has been eliminated, and the image can be rejected for cell counting. Panel C shows a histogram of circularities obtained from the image with good focus. The histogram of those objects previously identified as beads has also been plotted. The peak does not occur at 1.0 as expected for spherical objects. This is a special case of using features of known dimensions (FIG. 4) to detect issues with size calibration. In this case, the discrepancy could be caused by a faulty length calibration along one of the dimensions of the image. There may also be distortion resulting from the system's optics. Distortion may be another cause for rejection.

Figure 13:
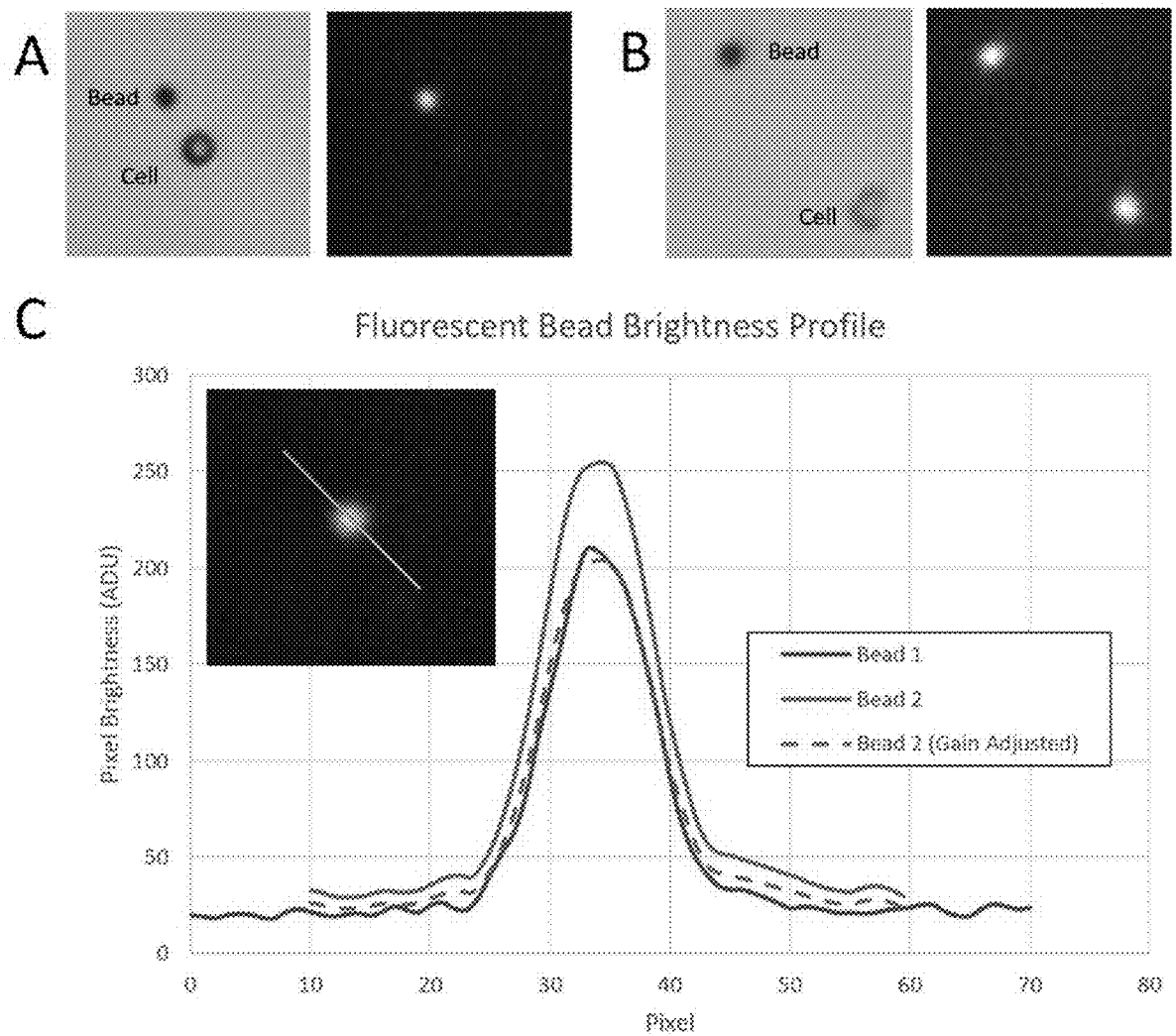
FIG. 13. Exemplary demonstration of imaged fluorescent beads.

Examples of imaged of fluorescent beads are shown in FIG. 13. In (A) and (B) are shown images of two Jurkat samples containing similar fluorescent beads. One cell and one bead were visible in each set of images. The cells were stained with propidium iodide, which labels dead cells. In the first set (A), the cell fluoresces were found very dimly. Without the presence of the bead, one could question whether the intensity of excitation illumination or the camera's exposure time were suitable for this assay. The bead allows for verification that the cell's dimness was due to it not fluorescing strongly, rather than something wrong with the instrument or settings.

In the second set of images (B), the Jurkat cell had absorbed propidium iodide and was fluorescing strongly. The fluorescent image of this cell was taken with a longer exposure time than the fluorescent image of the first cell (A), and the images would be difficult to compare reliably in the absence of a common reference feature. The presence of the standard beads allows for comparison and more consistent cell counting between the two images.

Panel C demonstrated a calibration of the intensity of the bead from panel B. In this case a simple brightness profile in one dimension was measured. It was found that adjusting the brightness of the second fluorescent image by a factor of 0.8 gave good agreement for the intensity of the bead with the bead in A.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

The invention claimed is:

1. A sample chamber suitable for holding a liquid sample for optical imaging, comprising:
   (a) an inlet for introducing the liquid sample into the sample chamber for observation or analysis;
   (b) an imaging chamber for holding the liquid sample, wherein the imaging chamber is in fluid communication with the inlet and comprises one or more optically transparent windows suitable for observation or analysis of the liquid sample inside the imaging chamber; and
   (c) an outlet in fluid communication with the imaging chamber for air escape or outflow of the liquid sample,
   wherein the imaging chamber is characterized by defined features that are inscribed on the bottom and/or ceiling of the imaging chamber and are optically accessible via the one or more optically transparent windows, the defined features having:
   one or more known offsets from a focal plane of the imaging chamber, and/or
   one or more known dimensions, areas or volumes.

2. The sample chamber of claim 1, wherein at least a portion of the chamber height is continuously varied.

3. The sample chamber of claim 1, wherein at least a portion of the chamber height is step-wisely varied.

4. The sample chamber of claim 1, wherein the chamber height is both continuously varied and step-wise varied.

5. The sample chamber of claim 1, wherein at least some of the defined features are 3-dimensional characterized by one or more defined feature heights.

6. The sample chamber of claim 5, wherein the one or more defined feature heights are the same.

7. The sample chamber of claim 5, wherein the one or more defined feature heights are different.

8. The sample chamber of claim 1, wherein all of the defined features are 3-dimensional characterized by one or more defined feature heights.

9. The sample chamber of claim 1, wherein the defined features comprise a plurality of coarse and fine features.

10. The sample chamber of claim 1, wherein the defined features exhibit one or more pre-defined patterns or geometrical shapes.

11. The sample chamber of claim 1, wherein the defined features exhibit one or more fluorescent colors and/or one or more fluorescent intensities.

12. The sample chamber of claim 1, wherein the imaging chamber is configured to have a volume of about 0.1 μL to about 200 μL.

13. A sample analysis unit, comprising:
   (i) a mixing well for preparation of a liquid sample for analysis; and
   (ii) a sample chamber accordingly to claim 1 deposed in spatial proximity to the mixing well.

14. A multi-well plate or device comprising a sample analysis unit of claim 13.

* * * * *